Feb. 16, 1954     H. N. SWIM, JR     2,669,080
COTTON PICKER DRUM ASSEMBLY
Filed June 9, 1951     2 Sheets-Sheet 1
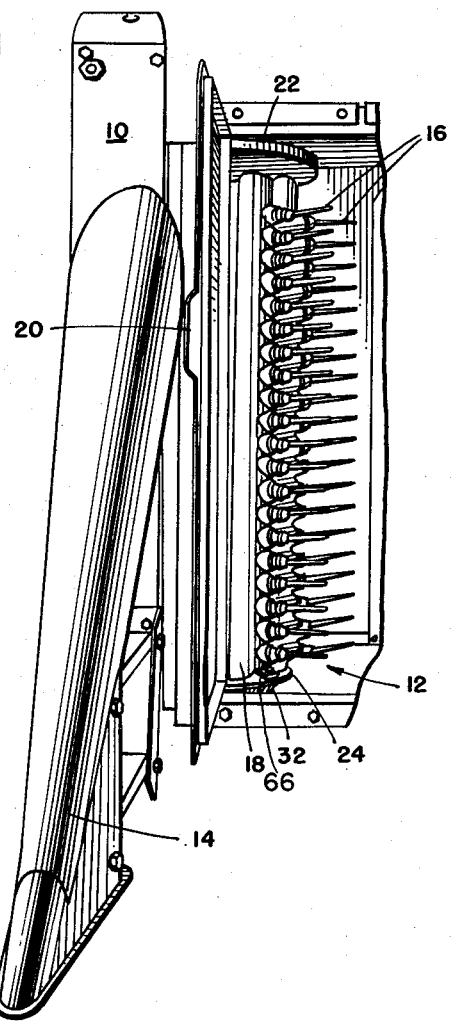
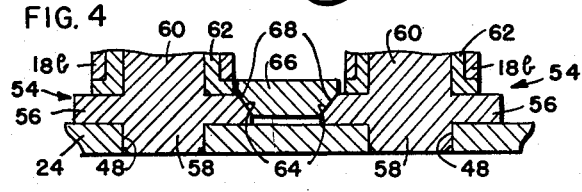
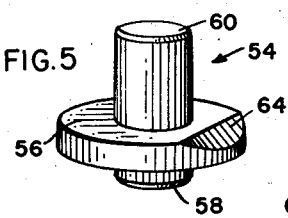
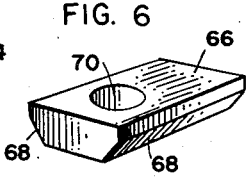
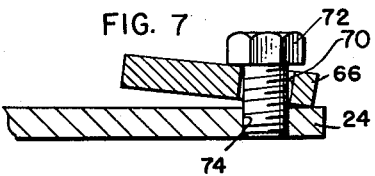
INVENTOR:
H. N. SWIM, JR.
BY
ATTORNEYS Feb. 16, 1954 H. N. SWIM, JR 2,669,080
COTTON PICKER DRUM ASSEMBLY
Filed June 9, 1951 2 Sheets-Sheet 2

INVENTOR:
H. N. SWIM, JR.
ATTORNEYS

Patented Feb. 16, 1954

2,669,080

UNITED STATES PATENT OFFICE 2,669,080

COTTON PICKER DRUM ASSEMBLY

Harold N. Swim, Jr., Des Moines, Iowa, assignor to Deere Manufacturing Co., Dubuque, Iowa, a corporation of Iowa Application June 9, 1951, Serial No. 230,821

6 Claims. (Cl. 56—44)

This invention relates to a picker drum assembly for a cotton picker. More particularly, the invention pertains to improved mounting means for carrying a plurality of picker bars on the lower supporting member or plate.

A typical cotton picker drum in which the present invention provides an improvement comprises an upper support and a lower support spaced apart vertically and arranged coaxially for rotation. The upper support has a plurality of circumferentially spaced carrier portions and the lower support has a similar plurality of carrier portions. These portions carry the upper and lower ends of a plurality of upright elongated picker bars. The mounting of the picker bars is such that each picker bar has individual angular movement about its own axis relative to the supports and relative to the other picker bars. Each picker bar carries a plurality of radially outwardly extending picker spindles. In one particular type of drum assembly, as exemplified by the disclosure in the U. S. Patent to Johnston 2,140,631, for example, the spindle bars are individually oscillated about their axes as the drum assembly as a whole rotates about the central vertical axis of the support.

Because of the peculiar motion involved in the picker drum assembly, it has heretofore been difficult to maintain perfect alinement of the picker bars. Part of this problem may be said to be due to the requirement that the picker bars must be removed from time to time to replace them or to replace the spindles carried thereby. Consequently, the mounting means at the upper and lower supports must accommodate these requirements. At the same time, the mounting means must furnish adequate bearing surfaces so that misalinement of the picker bars will not occur. Still, the construction must be such as to enable the picker drum assembly to be furnished as economically as possible. Consequently, expensive bearings of the type that might be utilized in conventional instances cannot be availed of in this situation.

According to the present invention, the problems are eliminated by the provision of a simple and economical mounting means including a plurality of mounting elements, each of which has a mounting stud for mounting on the lower support and each of which further has an upright bearing member in the form of a stud for receiving individually the lower end of the respective picker bar. The arrangement is such that neighboring pairs of mounting elements are so arranged as to be retained by a single lock or retainer element. Therefore, only half as many retaining elements are required as there are picker bars. In the preferred form of the invention illustrated, each mounting element is a one piece machined product of which the components are largely symmetrical so that they may be mass produced at low cost. The elements are arranged in pairs with respective pairs of picker bars and present cooperative edges with which the locking members individually coact for securing the mounting elements, and consequently the lower ends of the picker bars, in place on the lower support. It is another feature of the invention that the cooperating edges of the neighboring pairs of mounting elements are straight as viewed from above and are beveled so as to diverge upwardly; the lock elements are each of wedge shape in cross section so as to be received between cooperating neighboring edges. It is a still further feature of the invention to design the mounting elements so that they may be used in supports or drum assemblies of different diameters, the beveled edges accommodating different angular spacing between picker bars.

The foregoing and other important objects and desirable features inherent in and encompassed by the invention will become apparent as a preferred embodiment of the invention is fully disclosed in the following detailed description and accompanying sheets of drawings in which Figure 1 is a perspective fragmentary view of a portion of a typical cotton picking machine;

Figure 4 is an enlarged fragmentary sectional view taken substantially on the line 4—4 of Figure 3;

Figure 5 is an enlarged perspective view of one of the mounting elements;

Figure 6 is a perspective view of one of the retaining members; and

Figure 7 is a fragmentary sectional view on an enlarged scale taken on the line 7—7 of Figure 3.

Figure 2:
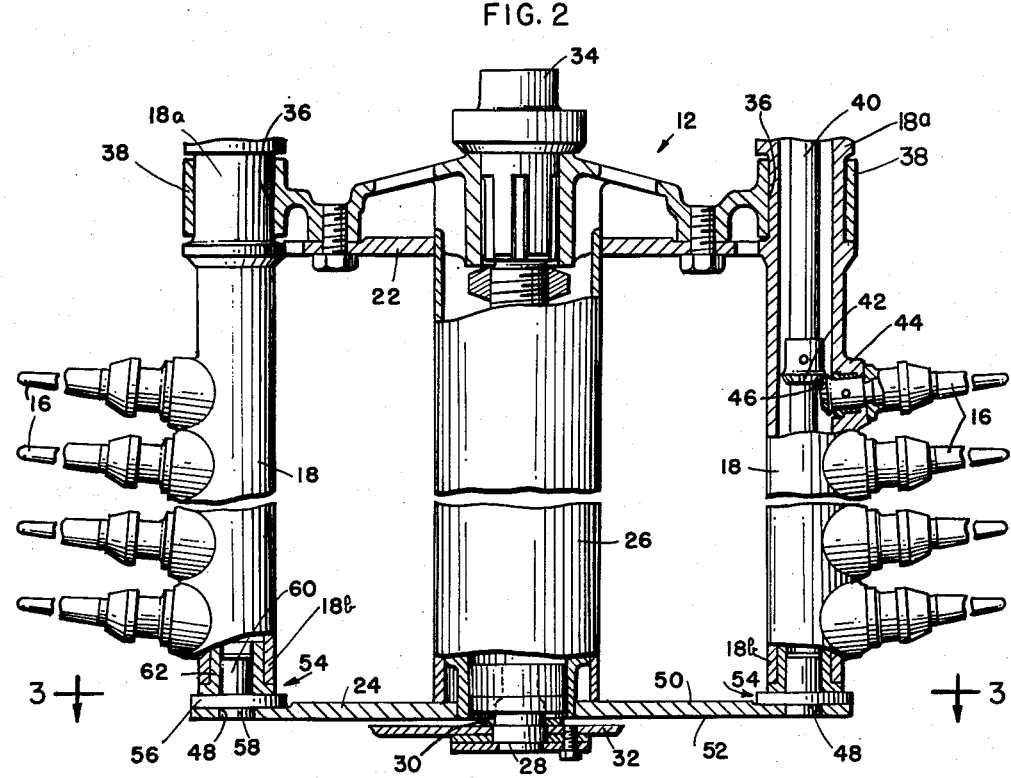
Figure 2 is an enlarged fragmentary sectional view through a typical cotton picker drum assembly.

That portion of the cotton picking machine shown in Figure 1 includes a picker housing 10 within which is mounted a picker drum assembly designated generally by the numeral 12. A divider 14 extends forwardly from the housing 12 and it is to the left of this divider that cotton plants pass to be picked by a plurality of rotating spindles 16 carried in a plurality of vertical rows by a plurality of columns in the form of upright picker bars 18. In the particular illustration referred to, a door 20, that is normally closed, is shown in its open position to expose the picker drum assembly 12.

As best shown in Figure 2, the picker drum assembly comprises an upper support 22 and a lower support 24. These supports are preferably coaxial and are joined together by a central tubular shaft 26 for rotation about their common axis. The lower portion of the tubular shaft has a depending stub shaft 28 that may be carried in a suitable bearing 30 on a fixed lower supporting plate 32. The upper support 22 may include an input shaft 34 by means of which the drum assembly 12 is rotated by any conventional mechanism, not important here.

In the present case, the picker bars 18 are twelve in number and are arranged in uniform circumferentially spaced relation about the drum assembly 12. Each picker bar 18 is of elongated construction and has upper and lower ends 18a and 18b. The upper ends are carried by the support 22 for individual angular movement of the picker bars 18 about their respective principal axes. The manner of mounting the upper ends 18a of the picker bars in the upper support 22 may follow conventional construction, in which case the upper support will include a plurality of carrier portions in the form of outwardly opening, semi-circular notches 36 that respectively receive the upper end portions 18a of the picker bars. Each notch is completed by a removable cap 38, the caps serving to provide bearings for journaling or rockably carrying the upper ends of the picker bars.

The right-hand portion of Figure 2 shows representatively the means by which the spindles 16 are rotated. Reference will be had to this construction merely for the purposes of orientation. Each picker bar 18 is hollow and has coaxially extending therethrough an input shaft 40 to which is keyed a plurality of vertically spaced bevel pinions 42, only one of which appears in the drawings. Each of the spindles is rotatably carried by a bearing portion 44 of the picker bar 18 and the inner end of each spindle has thereon a bevel pinion 46 meshing with the respective bevel pinion 42 on the spindle-driving shaft 40. As the drum rotates about its central axis 28—34, the picker bars 18 oscillate on their principal axes and the spindles 16 are driven in the manner just described.

The lower support 24 is preferably in the form of a circular plate having provided therein a plurality of uniformly circumferentially spaced, upwardly opening recesses in the form of small circular apertures 48. The lower support has upper and lower faces 50 and 52, each of which is preferably flat.

The apertures 48 are equal in number to the number of picker bars 18 and these apertures are, of course, respectively coaxial with the bearings 36—38 provided in the upper support 22, whereby these apertures constitute part of the means for journaling the lower ends 18b of the picker bars.

According to the present invention, there is provided a plurality of mounting elements, each designated generally by the numeral 54. There is one mounting element for each aperture 48. One mounting element is shown by itself in Figure 5, from which it will be seen that it comprises a flange 56, preferably circular, a depending mounting element or stud 58 extending from the lower face of the flange 56, and an upstanding bearing member or stud 60, that rises from the upper face of the flange 56. The studs 58 are received respectively in the circular apertures or recesses 48 and the upstanding bearing members or studs 60 are received respectively by the hollow lower ends of the picker bars 18. The connection between each picker bar 18 and the respective mounting element 54 may include a bushing 62 that has a press fit into the interior of the lower end 18b of the picker bar. Since, as will hereinafter appear, the mounting element 54 is fixed to the support 24, there is a bearing surface provided between the inner surface of the bushing 62 and the outer cylindrical surface of the bearing stud 60. The upper surface of the flange 56 provides a thrust bearing surface cooperative with the under surface of the bushing 62.

As stated above, the flange 56 on each element 54 preferably has a circular periphery. One peripheral edge portion of the flange is formed as a straight edge portion 64, preferably as a chord of the circle constituting the periphery of the flange 56. This edge portion has a beveled surface that inclines upwardly and inwardly toward the bearing stud 60.

The assembly is accomplished by grouping the picker bars in pairs. In the present disclosure, as previously stated, there are twelve picker bars. Therefore, there will be six pairs of picker bars to be considered in the assembly.

Figure 3:
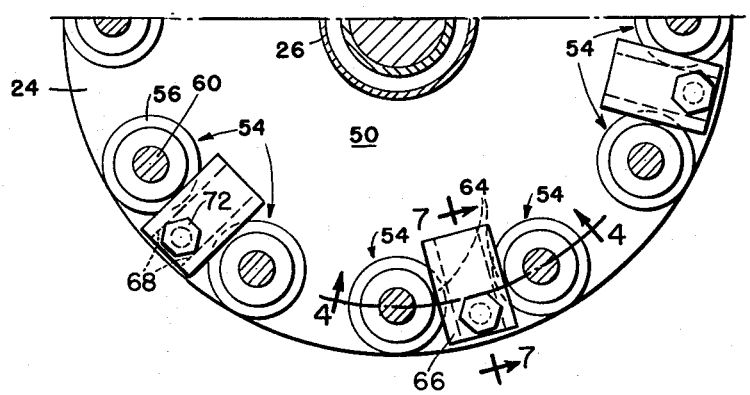
Figure 3 is a fragmentary sectional view taken on the line 3—3 of Figure 2.

Looking now at the pair of mounting elements included in the section line 4—4 in Figure 3 and also repeated in Figure 4, it will be seen that the mounting elements 54 are arranged so that the edge portions 64 are proximate or neighboring. The diameter of each flange—or its dimension measured angularly of the support—is such that the proximate or neighboring edge portions 64 are relatively closely spaced apart. These edge portions are parallel as viewed from above. Since each mounting element 54 is provided at only one side thereof with an edge portion 64, there will be only six pairs of proximate or neighboring edge portions. For this reason, then, the mounting elements may be retained by a plurality of retaining members 66 (Figure 6) equal in number to one half the number of picker bars or one half the number of mounting elements 54. Each retaining element or member is of elongated construction having opposite straight sides 68 that are beveled so as to converge downwardly. The mean distance across the beveled surfaces or sides 68 is substantially equal to the mean distance across the proximate or neighboring beveled surfaces 64. Hence, each retaining member 66 will be received between the neighboring edge portions 64 of neighboring mounting elements 54 in wedge-like fashion. Since the cooperative edges and sides involved are straight and parallel, the angular relationship of one mounting element 54 to its neighbor will be retained if the retaining member 66 is secured in place.

The securing of the retaining or lock member 66 is accomplished by the provision in each lock member of a vertical aperture 70 through which may be passed securing means in the form of a cap screw 72. These cap screws are threaded respectively into a plurality of circumferentially spaced tapped bores 74 in the plate 24.

Since the neighboring pairs of mounting elements 54 are secured by the respective lock or retaining members 66 against angular movement relative to the support or plate 24, the mounting studs 58 cannot wear out the mounting openings 48 in the plate 24. In other words, angular movement of the picker bars relative to the plate 24 will be confined to angular movement about the bearing surfaces between the respective bearing stud 60 and bushing 62. Consequently, no special material need be utilized in the lower support 24, as would be the case if angular movement were permitted between the mounting elements 54 and the support.

Among other features of the invention are the low cost of manufacture, the ability of the components to be mass produced, and the ease with which the drum assembly may be completed or disassembled. Still other features not specifically enumerated herein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. In an assembly made up of vertically spaced upper and lower horizontal, coaxial supports including between them a plurality of uniformly circumferentially spaced columns arranged in the supports for individual angular movement about their axes relative to the supports, and wherein the lower support has an upper radial face and a plurality of uniformly circumferentially spaced recesses opening upwardly and respectively coaxial with the columns, the improvement residing in means journaling the lower ends of the columns on the lower support, comprising: a plurality of similar mounting elements equal in number to the number of columns; each element having a horizontal flange resting on the upper face of the lower support, a depending stud received in the respective recess of the lower support, and an upstanding bearing stud coaxial with the depending stud and rotatably receiving the lower end of the respective column; each flange being of such dimension measured angularly of the lower support as to present an edge portion closely spaced angularly from a similar edge portion of a next adjacent flange; said edge portions on each pair of neighboring flanges being straight and parallel as viewed from above, each edge portion being beveled so that neighboring edge portions diverge upwardly; a plurality of retaining members equal in number to one-half the number of mounting elements, each retaining member having opposite straight parallel sides as viewed from above and said sides converging downwardly and received in wedge-like fashion between the edge portions of a pair of neighboring mounting elements; and a plurality of securing means, equal in number to the number of retaining members and individually securing the retaining members to the lower support.

2. In an assembly made up of vertically spaced upper and lower horizontal, coaxial supports including between them a plurality of uniformly circumferentially spaced columns arranged between the supports for individual angular movement about their axes relative to the supports, and wherein the lower support has an upper radial face and a plurality of uniformly circumferentially spaced recesses opening upwardly and respectively coaxial with the columns, the improvement residing in means journaling the lower ends of the columns on the lower support, comprising: a plurality of similar mounting elements equal in number to the number of columns, each element having a horizontal flange resting on the upper face of the lower support, a depending stud received in the respective recess of the lower support, and an upstanding bearing stud coaxial with the depending stud and rotatably receiving the lower end of the respective column; each flange being of such dimension measured angularly of the lower support as to present an edge portion closely spaced angularly from a similar edge portion of a next adjacent flange; said edge portions on each pair of neighboring flanges being straight and parallel as viewed from above; a plurality of retaining members equal in number to one-half the number of mounting elements, each retaining member having opposite straight parallel sides as viewed from above and converging downwardly and received between the edge portions of a pair of neighboring mounting elements; and a plurality of securing means, equal in number to the number of retaining members and individually securing the retaining members to the lower support.

3. In an assembly made up of vertically spaced upper and lower horizontal, coaxial supports including between them a plurality of uniformly circumferentially spaced columns arranged between the supports for individual angular movement about their axes relative to the supports, the improvement residing in means journaling the lower ends of the columns on the lower support, comprising: a plurality of similar mounting elements equal in number to the number of columns and arranged on the lower support in circumferentially spaced relation respectively coaxial with the columns; each element having a horizontal flange carried on the lower support and an upstanding bearing stud coaxial with and rotatably receiving the lower end of the respective column; each flange being of such dimension measured angularly of the lower support as to present an edge portion closely spaced angularly from a similar edge portion of a next adjacent flange; said edge portions on each pair of neighboring flanges being straight and parallel as viewed from above; each edge portion being beveled so that neighboring edge portions diverge upwardly; a plurality of retaining members equal in number to one-half the number of mounting elements, each retaining member having opposite straight parallel sides as viewed from above and said sides converging downwardly and received in wedge-like fashion between the edge portions of a pair of neighboring mounting elements; and a plurality of securing means, equal in number to the number of retaining members and individually securing the retaining members to the lower support.

4. In an assembly made up of vertically spaced upper and lower horizontal, coaxial supports including between them a plurality of uniformly circumferentially spaced columns arranged between the supports for individual angular movement about their axes relative to the supports, the improvement residing in means journaling the lower ends of the columns on the lower support, comprising: a plurality of similar mounting elements equal in number to the number of columns and arranged on the lower support in circumferentially spaced relation respectively coaxial with the columns; each element having a horizontal flange carried on the lower support and an upstanding bearing stud coaxial with and rotatably receiving the lower end of the respective column; each flange being of such dimension measured angularly of the lower support as to present an edge portion closely spaced angularly from a similar edge portion of a next adjacent flange; said edge portions on each pair of neighboring flanges being straight and parallel as viewed from above; a plurality of retaining members equal in number to one-half the number of mounting elements, each retaining member having opposite straight parallel sides as viewed from above converging downwardly and received between the edge portions of a pair of neighboring mounting elements; and a plurality of securing means, equal in number to the number of retaining members and individually securing the retaining members to the lower support.

5. In an assembly made up of vertically spaced upper and lower horizontal, coaxial supports including between them a plurality of uniformly circumferentially spaced columns arranged between the supports for individual angular movement about their axes relative to the supports, and wherein the lower support has an upper radial face and a plurality of uniformly circumferentially spaced recesses opening upwardly and respectively coaxial with the columns, the improvement residing in means journaling the lower ends of the columns on the lower support, comprising: a plurality of similar mounting elements equal in number to the number of columns; each element having a horizontal flange resting on the upper face of the lower support, a depending stud received in the respective recess of the lower support, and an upstanding bearing stud coaxial with the depending stud and rotatably receiving the lower end of the respective column; each flange being of such dimension measured angularly of the lower support as to present an edge portion closely spaced angularly from a similar edge portion of a next adjacent flange; said edge portions on each pair of neighboring flanges facing each other and being beveled so that neighboring edge portions diverge upwardly; a plurality of retaining members equal in number to one-half the number of mounting elements, each retaining member having opposite sides converging downwardly and received in wedge-like fashion between the edge portions of a pair of neighboring mounting elements; and a plurality of securing means, equal in number to the number of retaining members and individually securing the retaining members to the lower support.

6. In an assembly made up of vertically spaced upper and lower horizontal, coaxial supports including between them a plurality of uniformly circumferentially spaced columns arranged between the supports for individual angular movement about their axes relative to the supports, the improvement residing in means journaling the lower ends of the columns on the lower support, comprising: a plurality of similar mounting elements equal in number to the number of columns and arranged on the lower support in circumferentially spaced relation respectively coaxial with the columns; each element having a horizontal flange carried on the lower support and an upstanding bearing stud coaxial with and rotatably receiving the lower end of the respective column; each flange being of such dimension measuring angularly of the lower support as to present an edge portion closely spaced angularly from a similar edge portion of a next adjacent flange; said edge portions on each pair of neighboring flanges facing each other and being beveled so that neighboring edge portions diverge upwardly; a plurality of retaining members equal in number to one-half the number of mounting elements, each retaining member having opposite sides converging downwardly and received in wedge-like fashion between the edge portions of a pair of neighboring mounting elements; and a plurality of securing means, equal in number to the number of retaining members and individually securing the retaining members to the lower support.

HAROLD N. SWIM, Jr.

References Cited in the file of this patent

UNITED STATES PATENTS

| Number | Name | Date |
| --- | --- | --- |
| 374,529 | Ferguson | Dec. 6, 1887 |
| 1,141,515 | Alvey | June 1, 1915 |
| 1,786,851 | Johnston et al. | Dec. 30, 1930 |
| 2,140,631 | Johnston | Dec. 20, 1938 |